United States Patent
Tadaki et al.

(10) Patent No.: US 7,545,726 B2
(45) Date of Patent: Jun. 9, 2009

(54) OPTICAL DISC DRIVE

(75) Inventors: Kyoko Tadaki, Kawasaki (JP); Satoshi Shimokawa, Kawasaki (JP); Koichi Tezuka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 510 days.

(21) Appl. No.: 11/497,630

(22) Filed: Aug. 2, 2006

(65) Prior Publication Data

US 2007/0041304 A1    Feb. 22, 2007

(30) Foreign Application Priority Data

Aug. 18, 2005   (JP) ............................... 2005-237228

(51) Int. Cl.
*G11B 7/00* (2006.01)
(52) U.S. Cl. .................. 369/112.24; 369/121
(58) Field of Classification Search ............ 369/112.01, 369/112.24; 720/683
See application file for complete search history.

(56) References Cited

U.S. PATENT DOCUMENTS

| | | | |
|---|---|---|---|
| 6,314,064 B1 * | 11/2001 | Ueda et al. ............... | 369/44.23 |
| 7,301,864 B2 * | 11/2007 | Horinouchi et al. ...... | 369/44.37 |
| 2004/0114495 A1 | 6/2004 | Kim et al. | |
| 2005/0249097 A1 * | 11/2005 | Hashimura et al. ...... | 369/112.01 |
| 2006/0077809 A1 * | 4/2006 | Makita et al. ............ | 369/44.37 |

FOREIGN PATENT DOCUMENTS

JP    2004-134056    4/2004

* cited by examiner

*Primary Examiner*—Wayne R Young
*Assistant Examiner*—La Tanya Bibbins
(74) *Attorney, Agent, or Firm*—Greer, Burns & Crain, Ltd.

(57) ABSTRACT

An optical disc drive includes a light source and an objective optical system for condensing a light from the light source onto a recording surface of an optical disc. A chassis which is movable radially of the optical disc supports both the light source and the objective optical system. The light source includes a red/infrared unit having a red/infrared LD and a blue LD. The red/infrared LD generates both a red beam and an infrared beam. The blue LD generates a blue beam. The objective optical system includes a first and a second object lenses whose focal distances are different. The first and the second object lenses are disposed on a circumferential line of the optical disc.

10 Claims, 5 Drawing Sheets

OPTICAL DISC DRIVE

BACKGROUND OF THE INVENTION

1. Field of the Invention

The present invention relates to optical disc drives for reading information from different kinds of optical discs by using a plurality of beams of different wavelengths. In particular, the present invention relates to onboard optical disc drives for installation in automobiles, for example.

2. Description of the Related Art

Optical disc drives capable of reading information recorded on optical discs are widely used in audio visual devises with which people can enjoy music and movies. Many optical disc drives in recent years are designed to be compatible with different kinds of optical discs including CDs, DVDs and BDs (Blu-ray Disc). FIG. 5 shows such an optical disc drive (see JP-A-2004-134056 Gazette). An optical disc drive X shown in the figure is capable of reading information from three kinds of optical discs, i.e. CDs, DVDs and BDs, and includes a chassis which is movable radially of the optical disc, a red unit 91A, an infrared unit 91B, a blue unit 91C and an objective optical system 92 mounted on the chassis.

The red unit 91A and the infrared unit 91B are hologram units which are capable of emitting and receiving a red beam for reading DVDs and an infrared beam for reading CDs, respectively. The blue unit 91C is capable of emitting and receiving a blue beam for reading BDs, and includes a blue LD 91Ca, a light receiving element 91Cb, a monitor light-receiving element 91Cc and a beam splitter 91Cd. The objective optical system 92 is an optical system to be faced to the recording surface of the optical disc which is supported and rotated by a spindle Sp, and includes two object lenses 92a, 92b disposed in line extending in the radial direction of the optical disc.

A red beam and an infrared beam emitted from the red unit 91A and the infrared unit 91B pass through collimating lenses 93A and 93B, respectively, to become parallel rays and pass through the beam splitter 94 and come to the object lens 92a. Subsequently, the red beam and the infrared beam are condensed by the object lens 92a on the recording surface of the optical disc. The red beam and the infrared beam are then reflected by the recording surface of the optical disc, and then propagate along the optical paths altered appropriately by the beam splitter 94 before being received by the red unit 91A and the infrared unit 91B, respectively. The monitor light-receiving element 95 monitors the output from the red unit 91A and the infrared unit 91B.

A blue beam emitted from the blue LD 91Ca passes through the beam splitter 91Cd, then through a collimating lens 93C to become a parallel ray, and then travels to the object lens 92b. Subsequently, the blue beam is condensed by the object lens 92b on the recording surface of the optical disc. The reflected beam is then directed by the beam splitter 91Ce to the light receiving element 91Cb and the monitor light-receiving element 91Cc. As is clear from the above, according to the optical disc drive X, three kinds of optical discs, i.e. CDs, DVDs and BDs, can be read with one apparatus.

However, the optical disc drive X has the following problems when it is to be incorporated in an automobile: The optical disc drive X has two object lenses 92a, 92b disposed in line extending in the radial direction of the optical disc. Further, the infrared unit 91B is disposed radially outward of the optical disc. For these reasons, the chassis has to be relatively large in the disc's radial direction. In order to read information recorded in the recording surface of the optical disc, each of the two object lenses 92a, 92b is required to face any region from the radially innermost region to the radially outermost region of the recording surface on the optical disc. When reading the radially outermost region of the recording surface, the chassis is moved radially outward of the disc, and it is accordingly unavoidable that part of the chassis comes significantly out of the optical disc. Therefore, the optical disc drive X has to be big in size, and there has been a requirement for further size reduction for installation in automobiles.

SUMMARY OF THE INVENTION

The present invention has been proposed under the above-described circumstances. It is therefore an object of the present invention to provide a compact optical disc drive which is capable of reading different kinds of optical discs.

According to the present invention, there is provided an optical disc drive that comprises a light source and an objective optical system for condensing light from the light source onto a recording surface of an optical disc. A chassis which is movable radially of the optical disc supports both the light source and the objective optical system. The light source includes a red/infrared unit and a blue LD, where the red/infrared unit includes a red/infrared LD. The red/infrared LD generates both a red beam and an infrared beam. The blue LD generates a blue beam. The objective optical system includes a first and a second object lenses whose focal distances are different. The first and the second object lenses are disposed on a circumferential line of the optical disc. The optical disc drive further includes an erecting optical system disposed farther away from the optical disc than the objective optical system, for two beams coming from opposite directions along the circumferential line to be directed to the first and the second object lenses respectively. There is a first optical path provided between the red/infrared unit and the first object lens. The first optical path includes a section extending along the circumferential line to the erecting optical system and a section extending from the erecting optical system to the first object lens. A second optical path is provided between the blue LD and the second object lens. The second optical path includes a section extending along the circumferential line from an opposite direction to the first optical path toward the erecting optical system and a section extending from the erecting optical system to the second object lens.

The arrangements described as the above make it possible to reduce the size of an optical disc drive. First, by employing a red/infrared unit which is able to emit and receive both a red beam and an infrared beam, a compact light source is built as compared to a case in which a light emitting LD and a light receiving element are provided for each of the red beam and the infrared beam. Further, since the first and the second object lenses are disposed side by side in a circumferential direction, the size in the radial direction is now decreased. In addition, the first optical path and the second optical path are opposed to each other in the circumferential direction, and are separated from each other by the erecting mirror in between. This arrangement serves to reduce the size in the radial direction. From the reasons described above, it is possible to reduce the size of the optical disc drive.

Preferably, the second optical path further includes a section extending in parallel to the section extending to the erecting optical system and a section which provides connection between the section extending to the erecting optical system and the section extending in parallel thereto. An arrangement such as this is suitable for preventing the size in the circumferential direction from becoming unduly large even if the second optical-path is relatively long.

Preferably, the optical disc drive further includes a collimating lens disposed on the section extending to the erecting optical system of the second optical path. The collimating lens is movable on the circumferential line. An arrangement such as the above is advantageous when the optical disc has two layers of recording surfaces, since it is now possible to condense the light appropriately on each of the recording surfaces.

Preferably, the optical disc drive further includes an optical deflector disposed in the second optical path for deflecting a reflected beam from the optical disc toward a side disposed with the object lens, and a light detector disposed on the side where the object lens is disposed.

Preferably, the optical disc drive further includes an optical element for generation of an astigmatism, disposed between the optical deflector and the light detector with an astigmatic axis at approximately 45 degrees with respect to a circumferential direction represented by a reflection pattern from a mid-radius region of the disc. A parting line of the light detector generally coincides with the circumferential direction represented by the reflection pattern.

Preferably, the first object lens is closer to a radius of the optical disc drawn from the disc's center of rotation in a direction of travel of the chassis than the second object lens. An arrangement such as this allows a rational design e.g. that the first object lens will be used for reading the optical disc which requires a higher level of standards in reading accuracy.

Preferably, the first object lens is on a radius of the optical disc drawn from the disc's center of rotation in a direction of travel of the chassis. The second object lens is decentered from the radius. An arrangement such as this is suitable for improving reading accuracy of the first object lens.

Preferably, the second object lens has a shorter focal distance than the first object lens. Such an arrangement serves to decrease the amount of decentering of the second lens.

Preferably, the erecting optical system is a mirror which has a first reflection surface for reflecting the light traveling through the first optical path to the first object lens, and a second reflection surface for reflecting the light traveling through the second optical path to the second object lens. According to an arrangement such as the above, each of the beams coming from the first and the second optical paths can be directed in an upward direction appropriately.

Preferably, the optical disc drive is an onboard optical disc drive for installation in e.g. a passenger automobile. Such an arrangement makes it possible to install the optical disc drive in a limited space available in the automobile.

Preferably, a vibration-reducing damper is disposed in the chassis radially outward of the optical disc. Such an arrangement ensures appropriate reading operation even if the optical disc drive is subject to vibration from the moving automobile. Further, the arrangement contributes to a size reduction in the optical disc drive.

Other characteristics and advantages of the present invention will become clearer from the following detailed description to be made with reference to the attached drawings.

DETAILED DESCRIPTION OF THE PREFERRED EMBODIMENT

Hereinafter, a preferred embodiment of the present invention will be described specifically, with reference to the drawings.

Figure 1:
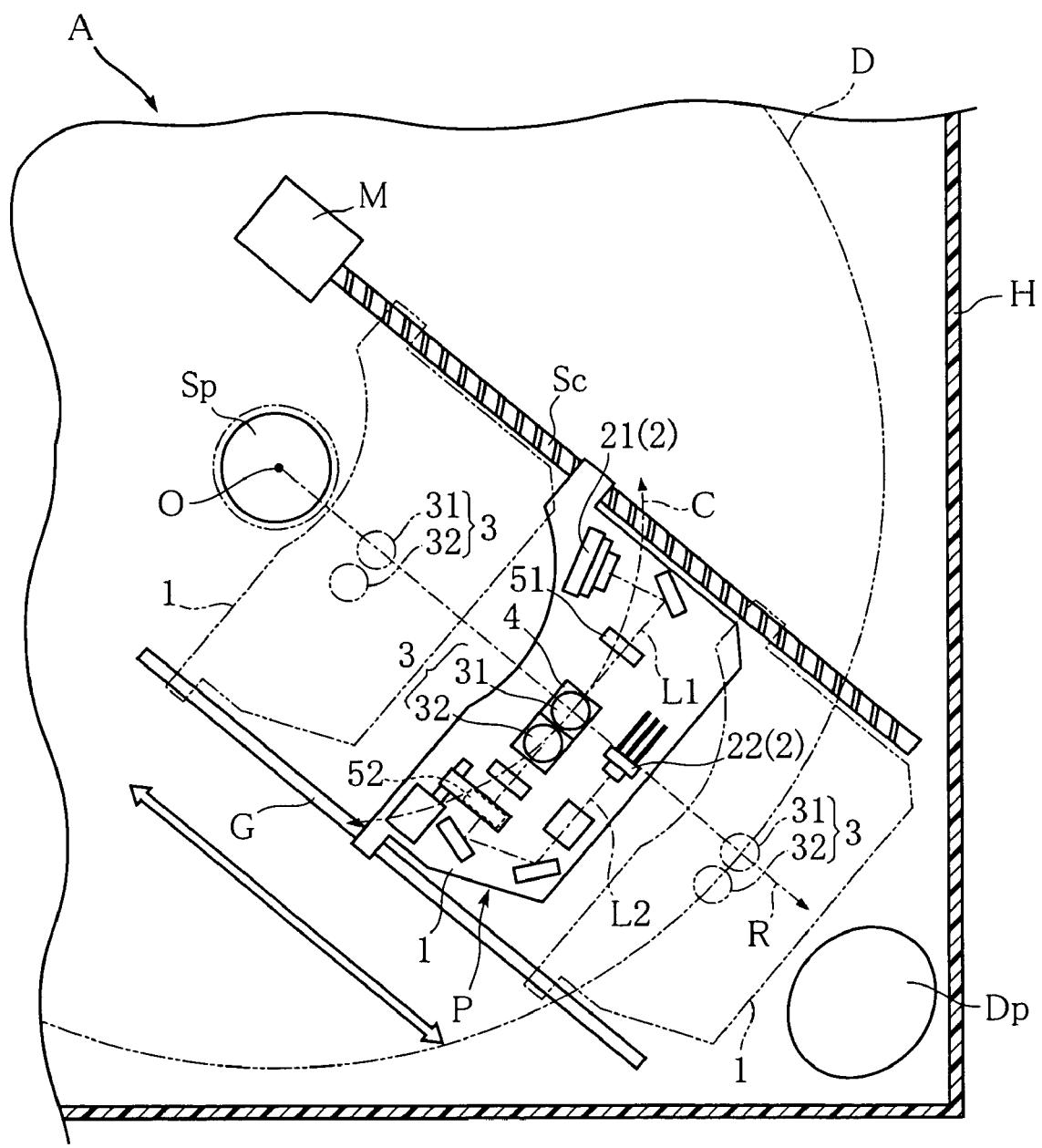
FIG. 1 is a plan view showing a primary portion of an optical disc drive according to the present invention.

FIG. 1 shows an optical disc drive according to the present invention. The illustrated optical disc drive A includes a housing H, a spindle Sp, a pick-up P, and a damper Dp. The optical disc drive A is capable of reading information recorded in an optical disc D. The optical disc drive A is an onboard type suitable for installation in an automobile, for example, and configured to be compatible with three kinds of optical discs, i.e. CDs, DVDs, and BDs.

The housing H is a flat box made of e.g. a resin, houses the spindle Sp, the pick-up P and the damper Dp, and is capable of housing the optical disc D. Since the optical disc drive A is an onboard type, the housing H is made thin, but rigid enough to be damage-resistant.

The spindle Sp holds the optical disc D at a predetermined position, and rotates the optical disc D about a point O. The spindle Sp has a rotation shaft which fits into a center hole of the optical disc D. The rotation shaft is rotated by an unillustrated motor.

The damper Dp reduces vibration of the optical disc D and pick-up P in the housing H. The damper Dp is disposed outward in the radial direction R of the optical disc D with respect to the pick-up P, i.e. at a lower right corner of the housing H in the figure. The damper Dp is preferably a vibration-reducing oil damper. The housing H accommodates three more unillustrated dampers at other locations. Though not illustrated, each of the four dampers may be connected at an end thereof to the housing H, and at the other end to a supporting board on which the spindle Sp, the pick-up P and so forth are mounted.

The pick-up P serves to read information recorded in the optical disc D for reproduction. The pick-up P is supported by a feed screw Sc and a guide G. The feed screw Sc is connected with a motor M. The pick-up P is reciprocable along the radial direction R by the rotation of the motor M.

Figure 2:
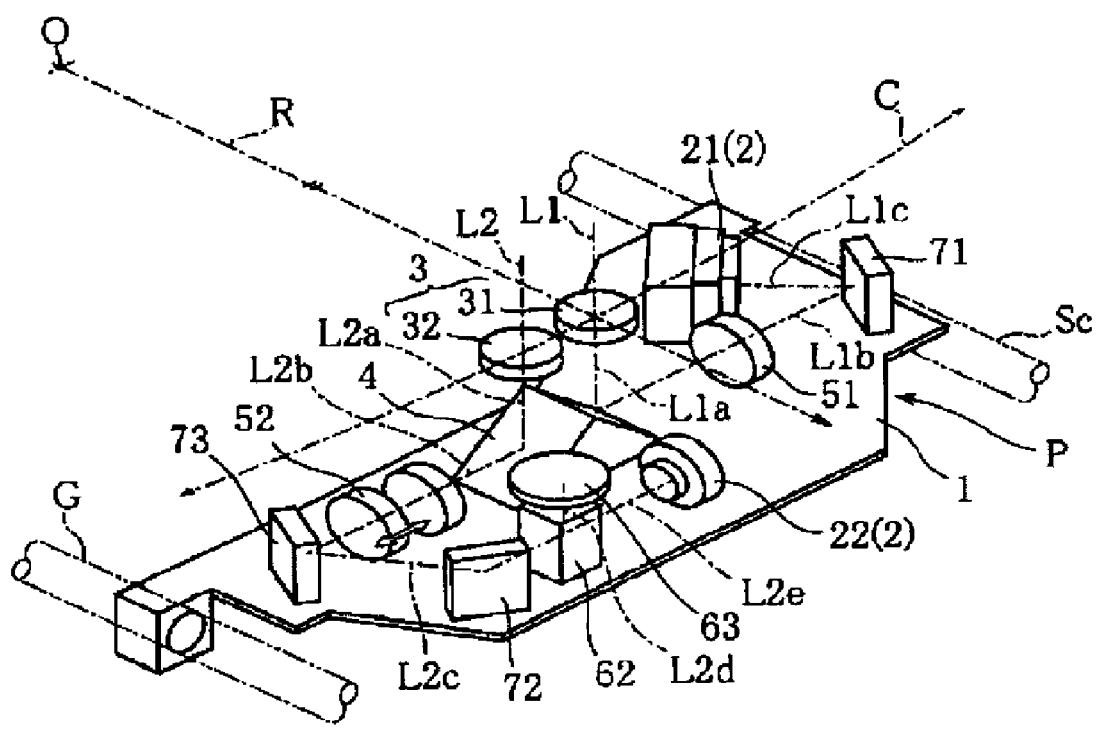
FIG. 2 is a perspective view showing a primary portion of the optical disc drive according to the present invention.
Figure 3:
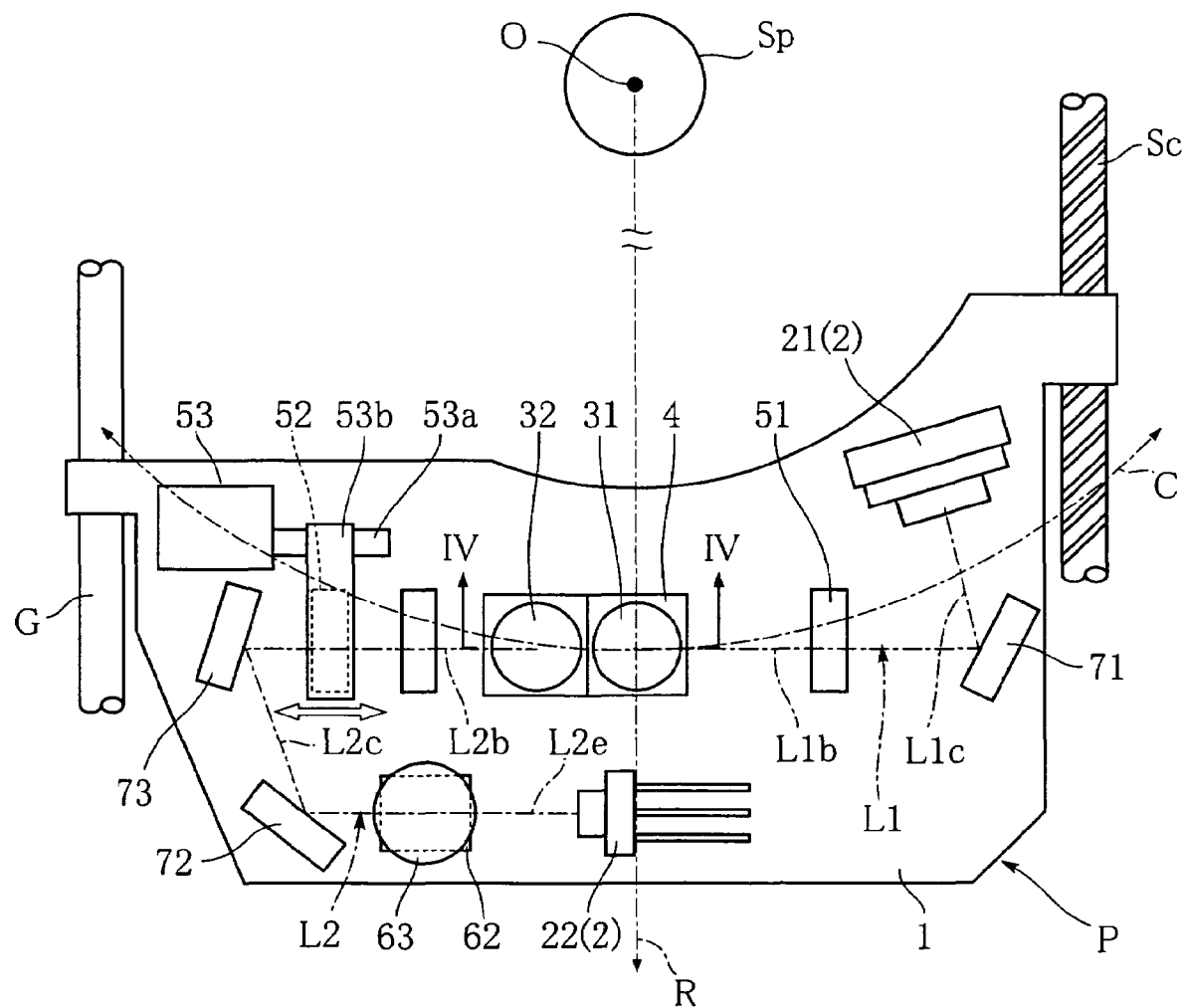
FIG. 3 is a plan view showing a primary portion of the optical disc drive according to the present invention.

As shown in FIG. 2 and FIG. 3, the pick-up P includes a chassis 1, a light source 2, an objective optical system 3, a light-erecting mirror 4, collimating lenses 51, 52, and mirrors 71, 72, 73. These optical parts provide a first and a second optical paths L1, L2.

The chassis 1 supports the light source 2, the objective optical system 3, the erecting mirror 4, the collimating lenses 51, 52 and the mirrors 71, 72, 73, and is made of a metal such as aluminum. The chassis 1 has two ends each formed with a hole facing the radial direction R; one hole is penetrated by the feed screw Sc and the other by the guide G.

The light source 2 includes a red/infrared unit 21 and a blue LD 22, and is capable of emitting laser beams of three wavelengths for reading information recorded in the optical disc D.

The red/infrared unit 21 is a so called dual-wavelength hologram unit which is capable of emitting and receiving two kinds of light i.e. a red beam and an infrared beam. The read beam, whose wavelength is approximately 660 nm, is for reading DVDs. The infrared beam, whose wavelength is approximately 785 nm, is for reading CDs. The term "hologram unit" means a unit, with e.g. a small plastic package, in which the functions of an LD for emitting light, a light receiving element for signal processing, and a beam splitter are integrated by utilizing a hologram element. The red/infrared unit 21 includes an LD which is capable of generating a red beam and an infrared beam, and a light receiving element which is capable of receiving the red beam and the infrared beam. As shown in FIG. 3, the red/infrared unit 21 is disposed in an upper right region of the chassis 1 in the figure, and is capable of emitting a red beam and a infrared beam toward a lower right direction in the figure, as well as receiving the red beam and the infrared beam coming from the lower right direction in the figure.

The blue LD 22 serves to emit a blue beam, and includes a laser chip mounted on a heat sink provided with a stem, for example. The blue beam, whose wavelength is 405 nm approximately, is for reading BDs. As shown in FIG. 3, the blue LD 22 is disposed at a lower center region of the chassis 1 in the figure, and is capable of emitting a blue beam to the left in the figure. In order to receive the blue beam which comes back after being reflected on the recording surface of the optical disc D, there are a beam splitter 62 and a blue light detector or an optoelectronic integrated circuit 63. The beam splitter 62 allows the blue beam which comes directly from the blue LD 22 to pass through, while reflecting the blue beam which comes back after being reflected by the optical disc D toward an upward direction in the figure. As shown in FIG. 2, the optoelectronic integrated circuit 63, which is disposed above the beam splitter 62 in the figure, receives the blue beam coming from the beam splitter 62 and is capable of outputting an electric signal according to the amount of light received.

Figure 4:
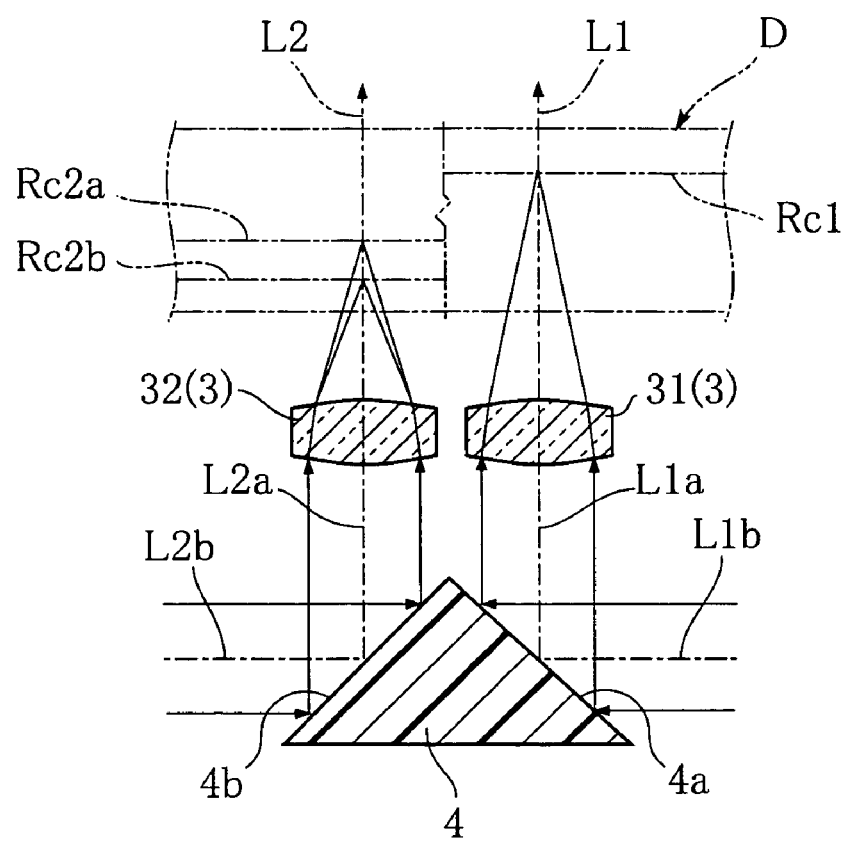
FIG. 4 is a sectional view of a primary portion taken in lines IV-IV in FIG. 3.
Figure 5:
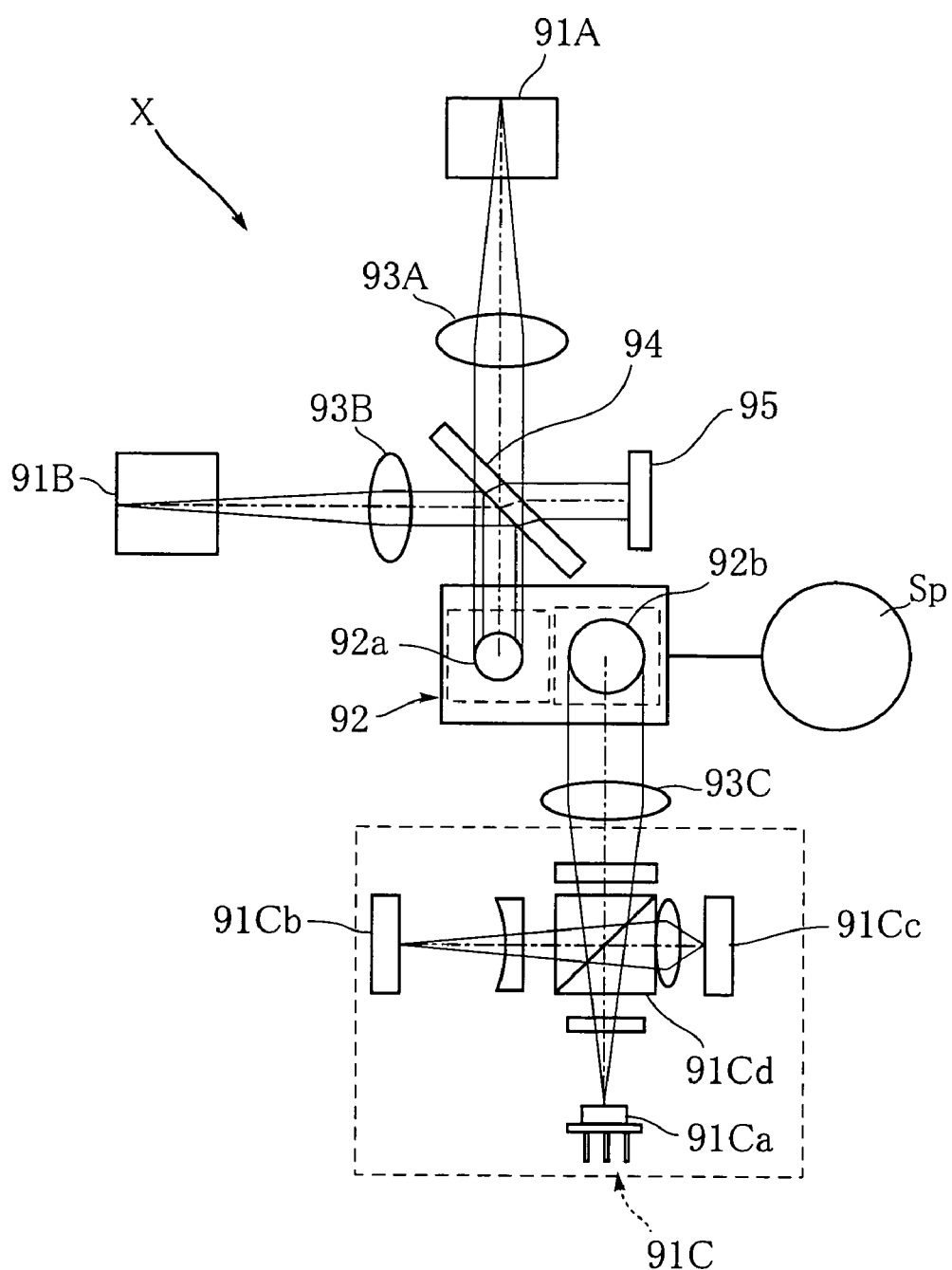
FIG. 5 is an overall schematic diagram of a conventional optical disc drive.

The objective optical system 3, which condenses the light from the light source 2 onto the recording surface of the optical disc D, and returns the reflected light from the recording surface to the light source 2, includes a first and a second object lenses 31, 32. As shown in FIG. 4, the first object lens 31 condenses the red beam and the infrared beam from the red/infrared unit 21 onto a recording surface Rc1 of the optical disc D provided as a DVD or a CD. On the other hand, the second object lens 32 condenses the blue beam from the blue LD 22 onto recording surfaces Rc2a, Rc2b of the optical disc D provided as a BD. As shown in FIG. 2, the first and the second object lenses 31, 32 are disposed above the chassis 1 in the figure, and face the recording surface of the optical disc D. Also, as shown in FIG. 3, the first and the second object lenses 31, 32 are disposed side by side in a circumferential direction C of the optical disc D. In the present embodiment, the first object lens 31 is disposed on a radius of the disc which passes through the point O and extending in the direction of movement of the pick-up P. On the other hand, the second object lens 32 is decentered from this radius. The second object lens 32 has a focal distance shorter than that of the first object lens 31. This difference is due to the difference between the industrial standards for CDs and DVDs and the industrial standards for BDs as well as practical design factors due to sizes of the object lenses.

The erecting mirror 4, which takes the shape of e.g. a prism having a triangular cross section as shown in FIG. 2, has a first and a second reflection surfaces 4a, 4b as shown in FIG. 4. The erecting mirror 4 is made of a resin base which has surfaces plated with a metal, for example. The first reflection surface 4a reflects the red beam and the infrared beam coming from the right in FIG. 4 toward an upward direction in the figure to propagate to the first object lens 31. The second reflection surface 4b reflects the blue beam coming from the left in FIG. 4 toward an upward direction in the figure to propagate to the second object lens 32.

The collimating lenses 51, 52 turn the red and infrared lights propagated from the red/infrared unit 21 and the blue light propagated from the blue LD 22, respectively, into parallel rays. As shown in FIG. 3, the collimating lens 52 is reciprocable in the right and the left directions in the figure, so as to condense the blue beam onto any one of the two recording surfaces Rc2a, Rc2b of the optical disc D which has a two-layer structure to constitute a BD, as shown in FIG. 4. As shown in FIG. 3, the collimating lens 52 is driven by a collimating lens drive 53. The collimating lens drive 53 is e.g. an electric actuator and provided with a shaft 53a which is movable forward and backward and a bracket 53b mounted thereon. The bracket 53b supports the collimating lens 52.

The mirrors 71, 72, 73 direct the red and infrared beams from the red/infrared unit 21 and the blue beam from the blue LD 22 toward the first and the second object lenses 31, 32, respectively. The mirror 71, which is disposed right in front of the red/infrared unit 21, i.e. right below the red/infrared unit in the figure, reflects the red beam and the infrared beam from the red/infrared unit 21 to the left in the figure, as well as reflecting the red beam and the infrared beam which have been reflected on the recording surface of the optical disc D to the red/infrared unit 21. The mirrors 72, 73 are disposed on the left side of the chassis 1 in the figure. The mirror 72, which is at the left side, i.e. the front side, of the blue LD 22, reflects the blue beam from the blue LD 22 toward the mirror 73. The mirror 73 reflects the blue beam reflected on the mirror 72 toward the collimating lens 52.

As shown in FIG. 2 and FIG. 3, the optical parts so far described provide the first and the second optical paths L1, L2 in the pick-up P. The first optical path L1 is a path along which the red beam and the infrared beam travel from the red/infrared unit 21, and then reach the recording surface Rc1 of the optical disc D shown in FIG. 4, and then come back to the red/infrared unit 21. The first optical path L1 includes an erecting section L1a, an opposing section L1b, and an emitting section L1c. The erecting section L1a extends from the first reflection surface 4a of the erecting mirror 4 shown in FIG. 4, through the first object lens 31, to the recording surface Rc1 of the optical disc D. The opposing section L1b extends in the circumferential direction C, from the first reflection surface 4a of the erecting mirror 4, through the collimating lens 51, to the mirror 71. The emitting section L1c is a leg from the red/infrared unit 21 to the mirror 71.

The second optical path L2 is a path along which the blue beam travels from the blue LD 22, and then reaches the recording surfaces Rc2a, Rc2b of the optical disc D shown in FIG. 4, and then comes back to the optoelectronic integrated circuit 63. The second optical path L2 includes an erecting section L2a, an opposing section L2b, a turning section L2c, a branching section L2d, and an emitting section L2e. The erecting section L2a extends from the second reflection surface 4b of the erecting mirror 4 shown in FIG. 4, through the second object lens 32, to the recording surfaces Rc2a, Rc2b of the optical disc D. The opposing section L2b extends in the circumferential direction C, from the second reflection surface of the erecting mirror 4, through the collimating lens 52, to the mirror 73. The opposing section L2b lies generally on the same line as does the opposing section L1b of the first optical path L1, and the beams traveling on the respective optical paths to the optical disc D travel in opposite directions to each other. The turning section L2c, which is a leg sandwiched by the two mirrors 72, 73, connects the opposing section L1b with the emitting section L1e. The emitting section L2e extends from the blue LD 22, through the beam splitter 62 to the mirror 72, generally in parallel to the opposing section L2b. The branching section L2d is a leg along which the blue beam reflected by the beam splitter 62 in an upward direction in FIG. 2 passes through an unillustrated astigmatism generating element, to the optoelectronic integrated circuit 63.

Next, the advantages of the optical disc drive A will be described below.

According to the present embodiment, it is possible to reduce the size of an optical disc drive A. First, by employing a red/infrared unit 21 which is able to emit and receive both a red beam and an infrared beam, a compact light source 2 is built as compared to a case in which a light emitting LD and a light receiving element are provided for each of the red beam and the infrared beam. Further, since the first and the second object lenses 31, 32 are disposed side by side in the circumferential direction C, an objective optical system 3 has a reduced size shorter in the radial direction R. Since the first and the second object lenses are disposed at generally the same position in the radial direction R, it is possible to reduce the traveling distance for the pick-up P to move in the radial direction R as compared to a case where the first and the second object lenses 31, 32 are disposed in the radial direction R for example. The amount of projection of the pick-up P in the radial direction becomes smaller, which serves to reduce the size of the housing H. In addition, the first optical path L1 and the second optical path L2 are opposed to each other in the circumferential direction C, being separated from each other by the erecting mirror 4 in between. This arrangement has reduced the size of the pick-up P in the radial direction R. From the points described above, according to the present embodiment, it is possible to reduce the size of the optical disc drive A, through size reduction of the pick-up P, distance reduction of the travel path of the pick-up P, and so on. The apparatus is suitable for installation in a small restricted space in automobiles.

The second optical path L2 is relatively long since it is provided by relatively many parts such as a blue LD 22, a reciprocable collimating lens 52, a beam splitter 62, and an optoelectronic integrated circuit 63. According to the present embodiment however, the second optical path L2 is a folded path including a turning section L2c. This arrangement is suitable for preventing the pick-up P from becoming unduly large in the circumferential direction C.

Since the collimating lens 52 can move back and forth, it is possible to condense the beam on two layers of recording surfaces Rc2a, Rc2b shown in FIG. 4. Further, the collimating lens 52 is disposed in the opposing section L2b of the second optical path L2, which works advantageously in reducing the size of the pick-up P.

Since the first object lens 31 is on a radius which passes the point O and extends in the direction where the pick-up P moves, it is possible to improve reading accuracy of the pick-up P when moving in the radial direction R. The first object lens 31 has a longer focal distance than the second object lens 32. According to the present embodiment, the second object lens 32 which has a high NA has a shorter focal distance than the first object lens 31, and therefore it is possible to make the amount of decentering of the second object lens 32 relatively small.

The astigmatism generating element is provided by a cylindrical lens bonded to the beam splitter 62. The cylindrical lens is angled by 45 degrees with respect to the circumferential direction represented by the reflection pattern from the mid-radius region of the disc, and is disposed so that one of the parting lines of the optoelectronic integrated circuit 63 will coincide with the circumferential direction represented by the reflection pattern. This arrangement prevents deterioration in reading accuracy caused by decentering of the second object lens 32 although decentering of the first object lens 31 is more marginal.

As shown in FIG. 1, the dampers Dp are disposed radially outward of the pick-up P. The pick-up P is small and the amount of projection of the pick-up P in the radial direction R is also small. Thus, it is possible to make room for placing the dampers Dp in the housing H. The dampers Dp ensure proper reading of the optical disc even if the optical disc drive A is subject to vibration from the moving automobile.

The optical disc drive according to the present invention is not limited to the embodiment described above. Specific design and arrangement in each component included in the optical disc drive according to the present invention may be varied in many ways.

The erecting optical system used in the present invention is not limited to the erecting mirror described above, but may be provided by a beam splitter which is capable of reflecting each of the red beam, the infrared beam and the blue beam in desired directions. Further, the present invention is not limited to an arrangement in which the first object lens is on a radius of the optical disc which extends in the direction of movement of the pick-up. For example, the first object lens may be closer to the above-described radius than the second object lens.

The invention claimed is:

1. An optical disc drive comprising:
   a light source including a red/infrared unit and a blue LD, the red/infrared unit being configured to generate both a red beam and an infrared beam, the blue LD being configured to generate a blue beam;
   an objective optical system for condensing light from the light source onto a recording surface of an optical disc, the objective optical system including a first and a second object lenses having different focal distances and arranged side by side in a circumferential direction of the disc;
   a chassis that is movable radially of the optical disc and supports both the light source and the objective optical system;
   an erecting optical system disposed farther away from the optical disc than the objective optical system for causing two beams propagating circumferentially of the disc in opposite directions to be directed toward the first and the second object lenses, respectively;
   a first optical path provided between the red/infrared unit and the first object lens, the first optical path including a first section extending circumferentially of the disc to the erecting optical system and a second section extending from the erecting optical system to the first object lens; and
   a second optical path provided between the blue LD and the second object lens, the second optical path including a third section extending, in an opposite direction to the first section of the first optical path, to the erecting optical system and a fourth section extending from the erecting optical system to the second object lens.

2. The optical disc drive according to claim 1, wherein the second optical path further includes a fifth section and a sixth section, the fifth section extending in parallel to the third section, the sixth section connecting the third section and the fifth section to each other.

3. The optical disc drive according to claim 1, further comprising a collimating lens that is disposed on the third section of the second optical path and movable circumferentially of the disc.

4. The optical disc drive according to claim 1, further comprising a beam splitter and a light detecting element for the second optical path, wherein the beam splitter causes part of reflected light propagating along the second optical path after reflection by the optical disc to be directed toward the optical disc, the optical detecting element being configured to detect the part of reflected light directed toward the optical disc.

5. The optical disc drive according to claim 4, further comprising an astigmatism generating element disposed between the beam splitter and the light detecting element, wherein the astigmatism generating element is arranged so that an axis of astigmatism makes an angle of substantially 45 degrees with respect to a circumferential direction represented by a reflection pattern resulting from a mid-radius region of the disc, wherein a parting line of the light detecting element substantially coincides with the circumferential direction represented by the reflection pattern.

6. The optical disc drive according to claim 1, wherein the first object lens, in comparison with the second object lens, is closer to a radius of the optical disc drawn from a rotation center of the disc and extending in a direction of chassis movement.

7. The optical disc drive according to claim 1, wherein the first object lens is on a radius of the optical disc drawn from a rotation center of the disc and extending in a direction of chassis movement, the second object lens being offset from the radius.

8. The optical disc drive according to claim 6, wherein the second object lens has a shorter focal distance than a focal distance of the first object lens.

9. The optical disc drive according to claim 1, wherein the erecting optical system is a mirror including a first reflection surface and a second reflection surface, the first reflection surface being configured to cause light traveling along the first optical path to be directed toward the first object lens, the second reflection surface being configured to cause light traveling along the second optical path to be directed toward the second object lens.

10. The optical disc drive according to claim 1, further comprising a vibration-reducing damper spaced away from the chassis in a radially outward direction of the optical disc.

* * * * *